(12) United States Patent
Tsai

(10) Patent No.: US 8,240,698 B2
(45) Date of Patent: Aug. 14, 2012

(54) COLLAPSIBLE STRUCTURE FOR BABY STROLLER

(75) Inventor: Raymond Tsai, Tainan Hsien (TW)

(73) Assignee: Bumbleride Inc., San Diego, CA (US)

( * ) Notice: Subject to any disclaimer, the term of this patent is extended or adjusted under 35 U.S.C. 154(b) by 436 days.

(21) Appl. No.: 12/560,600

(22) Filed: Sep. 16, 2009

(65) Prior Publication Data

US 2011/0062681 A1     Mar. 17, 2011

(51) Int. Cl.
    *B62B 7/06*     (2006.01)
(52) U.S. Cl. ............................ 280/647; 280/42; 280/657
(58) Field of Classification Search ............... 280/642, 280/643, 647, 648, 650, 657, 658, 47.38, 280/47.4, 42
    See application file for complete search history.

(56) References Cited

U.S. PATENT DOCUMENTS

| | | | | | |
|---|---|---|---|---|---|
| 2,378,931 | A | * | 6/1945 | Kiesow | 280/643 |
| 3,873,117 | A | * | 3/1975 | Perego | 280/650 |
| 4,019,757 | A | * | 4/1977 | Beger et al. | 280/649 |
| 4,906,017 | A | * | 3/1990 | Kassai | 280/642 |
| 5,288,098 | A | * | 2/1994 | Shamie | 280/642 |
| 5,845,924 | A | * | 12/1998 | Huang | 280/642 |
| 6,322,098 | B1 | * | 11/2001 | Lan | 280/642 |
| 7,108,275 | B2 | * | 9/2006 | Yeh et al. | 280/647 |
| 7,178,822 | B2 | * | 2/2007 | Chen | 280/642 |
| 7,766,368 | B2 | * | 8/2010 | Tsai | 280/649 |
| 2006/0214396 | A1 | * | 9/2006 | Horacek | 280/642 |

* cited by examiner

*Primary Examiner* — Frank Vanaman

(57) ABSTRACT

A collapsible structure for baby strollers includes a main frame including two first support rods, each first support rod having an engaging member which includes a protrusion, and a connection part which includes a first hook. Two handles are pivotally connected to the two engaging members respectively, and the two handles are provided with two locking units. Each locking unit includes a first connection member extending through a pull member, a second connection member extending through a restriction member and a third connection member extending through a positioning hole of each handle to be contacted with a resilient member located in a space in each locking unit. The restriction member includes a recess operatively engaged with the protrusion when unfolding the stroller, and a second hook securely engaged with the first hook when the stroller is folded.

2 Claims, 11 Drawing Sheets

COLLAPSIBLE STRUCTURE FOR BABY STROLLER

FIELD OF THE INVENTION

The present invention relates to a collapsible structure for baby strollers, wherein a protrusion of an engaging member is engaged with a recess of a restriction member so as to position handles, and a first hook and a second hook are hooked to each other to ensure that the handles are well positioned when the stroller is folded.

BACKGROUND OF THE INVENTION

A conventional baby stroller is made to be foldable so as to minimize the space required of storage and carry. A conventional collapsible structure for baby strollers is disclosed in TW Utility Model No. 315186 titled "A Safety Lock Device for a Collapsible Baby Stroller. The applicant discloses a frame which can be folded longitudinally and laterally, and the frame includes an upper frame having two handles on two sides thereof, a lower frame which is pivotally connected to the upper frame by a joint member which has an engaging portion, a first collapsible unit located at two sides of the lower frame and can be expanded and folded, and a safety lock device which is connected between the upper frame and the joint member. The safety lock device is engaged with the engaging portion so that when the first collapsible unit is released, the upper frame and the lower frame maintain their expanded or use status.

However, the conventional collapsible structure is complicated, difficult to be manufactured, and includes high cost. There are problems during operation and the safety lock device can be unintentionally activated by impact so that the conventional collapsible structure cannot achieve its desired function.

SUMMARY OF THE INVENTION

For overcoming the aforesaid drawbacks of the conventional collapsible structure, the present invention relates to a collapsible structure for baby strollers, and the structure comprises a main frame including two first support rods on two sides thereof and each first support rod has a first end and a second end. An engaging member is connected to the first end of each of the first support rods and includes a protrusion. Two second support rods are pivotally connected to the two first support rods respectively. Each first support rod has a connection part which includes a first hook. Two handles are pivotally connected to the two engaging members respectively on the first support rods. The handles are hollow tubes, and each includes a first slot, a second slot and a positioning hole. The two handles are provided with two locking units. Each locking unit has a first connection member which extends through a pull member and is movably engaged within the first slot. A second connection member extends through a restriction member and is movably engaged within the second slot of each handle. Each restriction member includes a recess and has a second hook. The locking units each have a space in which a resilient member is located. A third connection member extends through the positioning hole of each locking unit and the resilient member contacts the third connection member.

A collapsible unit is pivotally connected between the two second support rods and includes two first links and two second links. A third link is pivotally connected between the two first links and a fourth link is pivotally connected between the two second links. Two fifth links are pivotally connected between one of the two first links, the third link, and the two second links. The fourth link has an operation portion thereon.

The present invention includes the following advantages:

(1) The protrusion of the engaging member is engaged with the recess of the restriction member so that the main frame and the handles are securely connected, and this avoids unexpected separation by unintentional touch.

(2) The first hook of the connection part can be hooked to the second hook of the restriction member to ensure that the folded stroller in a stable and reliable status and does not unfold by impact.

(3) The present invention has a simple structure and is easy to operate and provides multiple safety protections.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
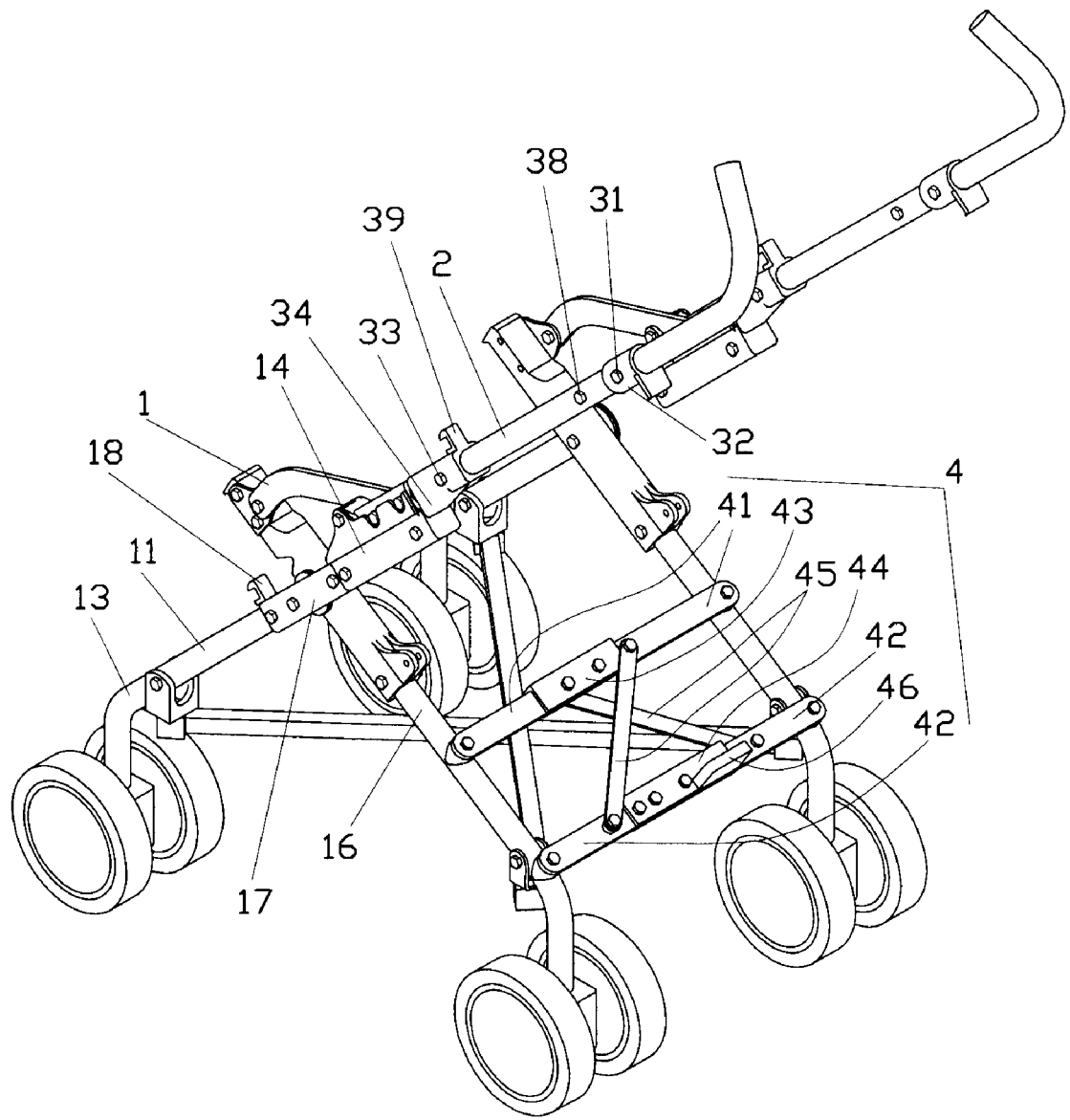
FIG. 1 is a perspective view of the present invention.
Figure 2:
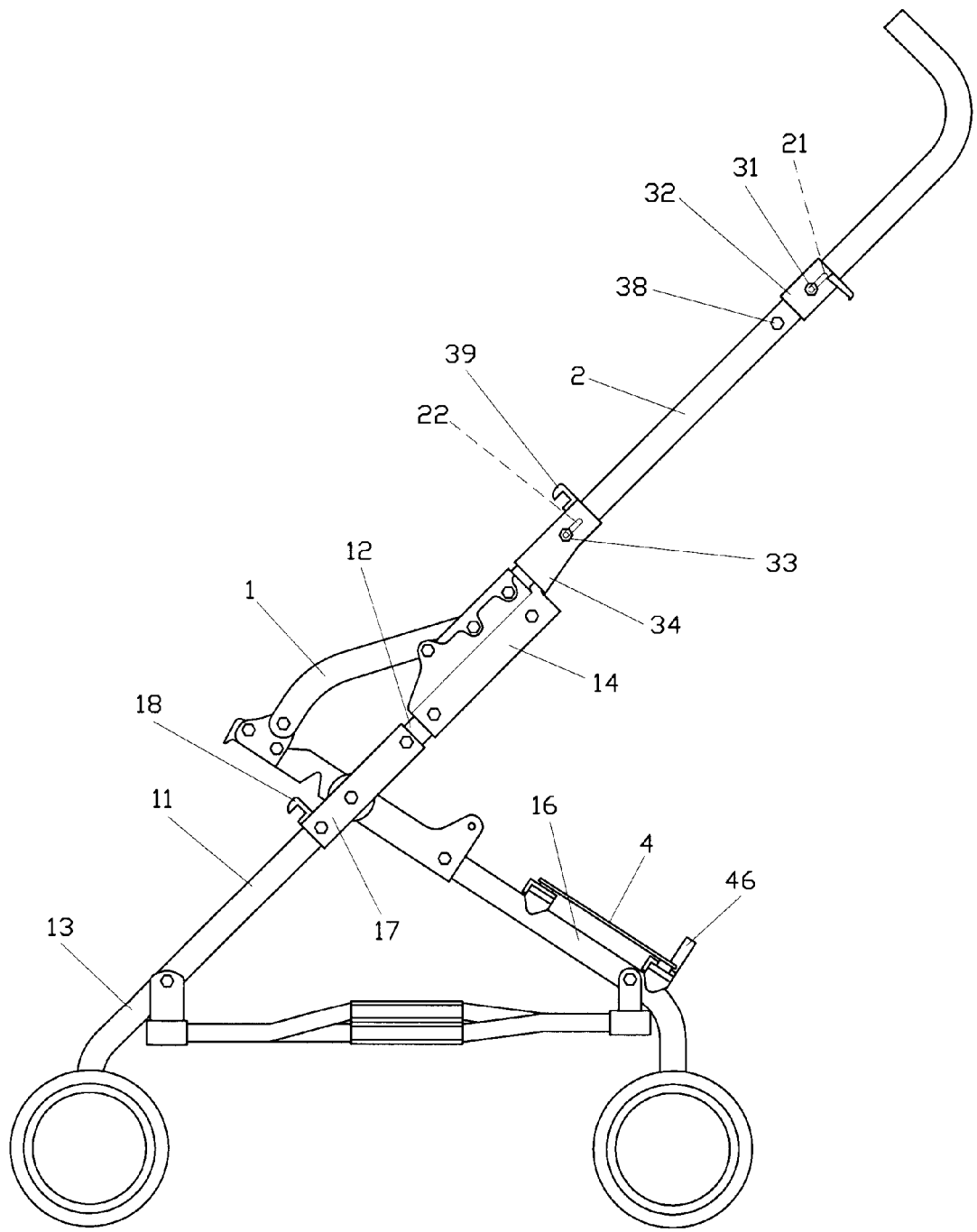
FIG. 2 is a side view of the present invention.
Figure 3:
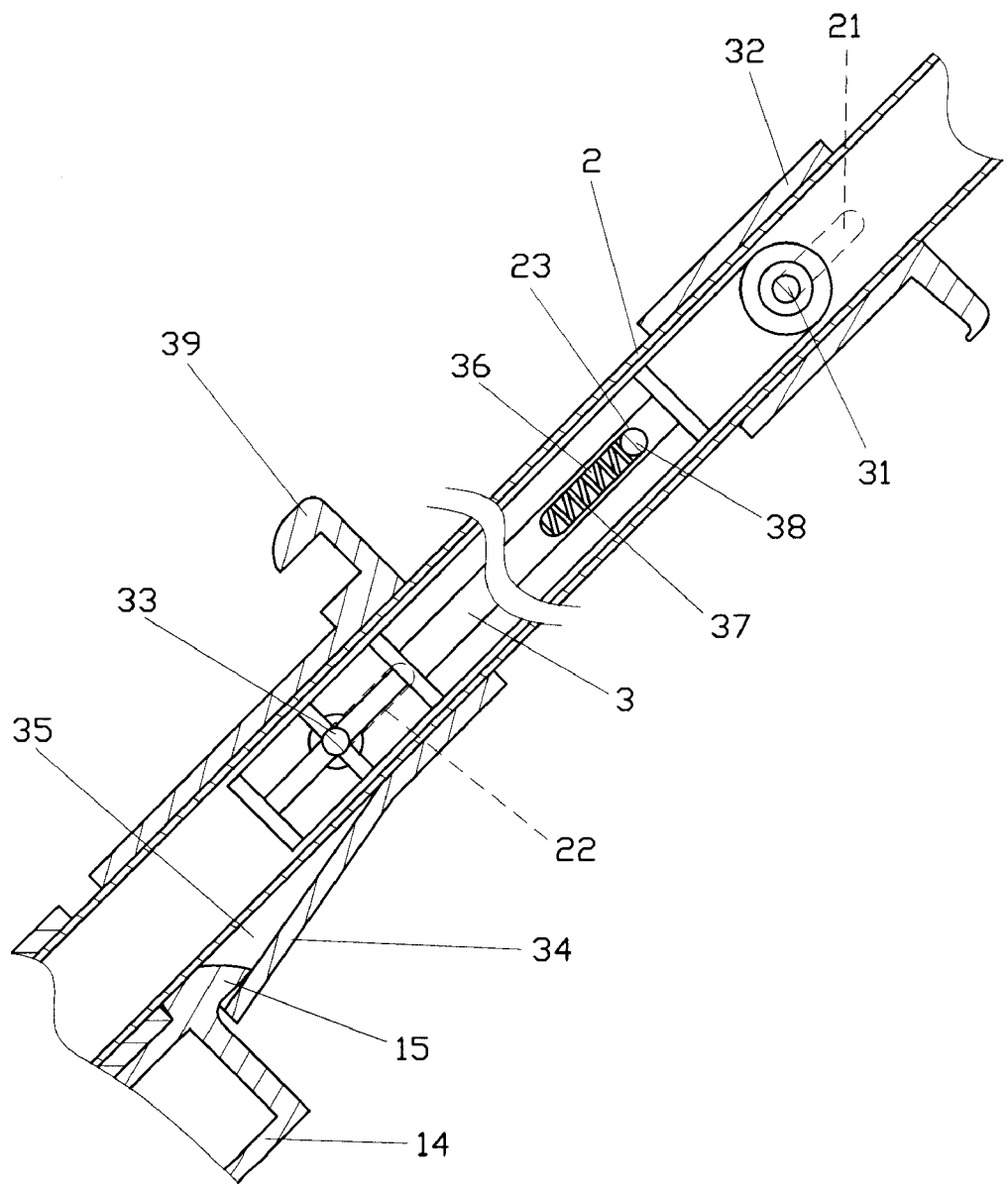
FIG. 3 is a cross sectional view to show the handle and the locking unit of the present invention.

Referring to FIGS. 1 to 3, the present invention comprises a main frame 1, two handles 2, two locking units 3 and a collapsible unit 4. The main frame 1 includes two first support rods 11 on two sides thereof and each first support rod 11 has a first end 12 and a second end 13. An engaging member 14 is connected to the first end 12 of each of the first support rods 11 and includes a protrusion 15. Two second support rods 16 are pivotally connected to the two first support rods 11 respectively. Each first support rod 11 has a connection part 17 which includes a first hook 18.

The two handles 2 are pivotally connected to the two engaging members 14 respectively on the first support rods 11. The handles 2 are hollow tubes, and each handle 2 includes a first slot 21, a second slot 22 and a positioning hole 23.

Each locking unit 3 has a first connection member 31 and a second connection member 33. The first connection member 31 extends through a pull member 32 and is movably engaged within the first slot 21. The second connection member 33 extends through a restriction member 34 and is movably engaged within the second slot 22 of each handle 2. Each restriction member 34 includes a recess 35 with which the protrusion 15 is engaged so as to position the handle 2 to the first support rod 11 of the main frame 1. Therefore, the handle 2 will not be folded unexpectedly to ensure the safety use. Each locking unit 3 has a space 36 in which a resilient member 37 is located. A third connection member 38 extends through the positioning hole 23 of each handle 2 and the resilient member 37 contacts the third connection member 38. Furthermore, each restriction member 34 each have has a second hook 39.

A collapsible unit 4 is pivotally connected between the two second support rods 16 and includes two first links 41 and two second links 42. A third link 43 is pivotally connected between two respective ends of the two first links 41 and a fourth link 44 is pivotally connected between two respective ends of the two second links 42. Two fifth links 45 are pivotally connected between one of the two first links 41, the third link 43, and the two second links 42. The two fifth links 45 are arranged crossly to each other. The fourth link 44 has an operation portion 46 thereon.

Figure 4:
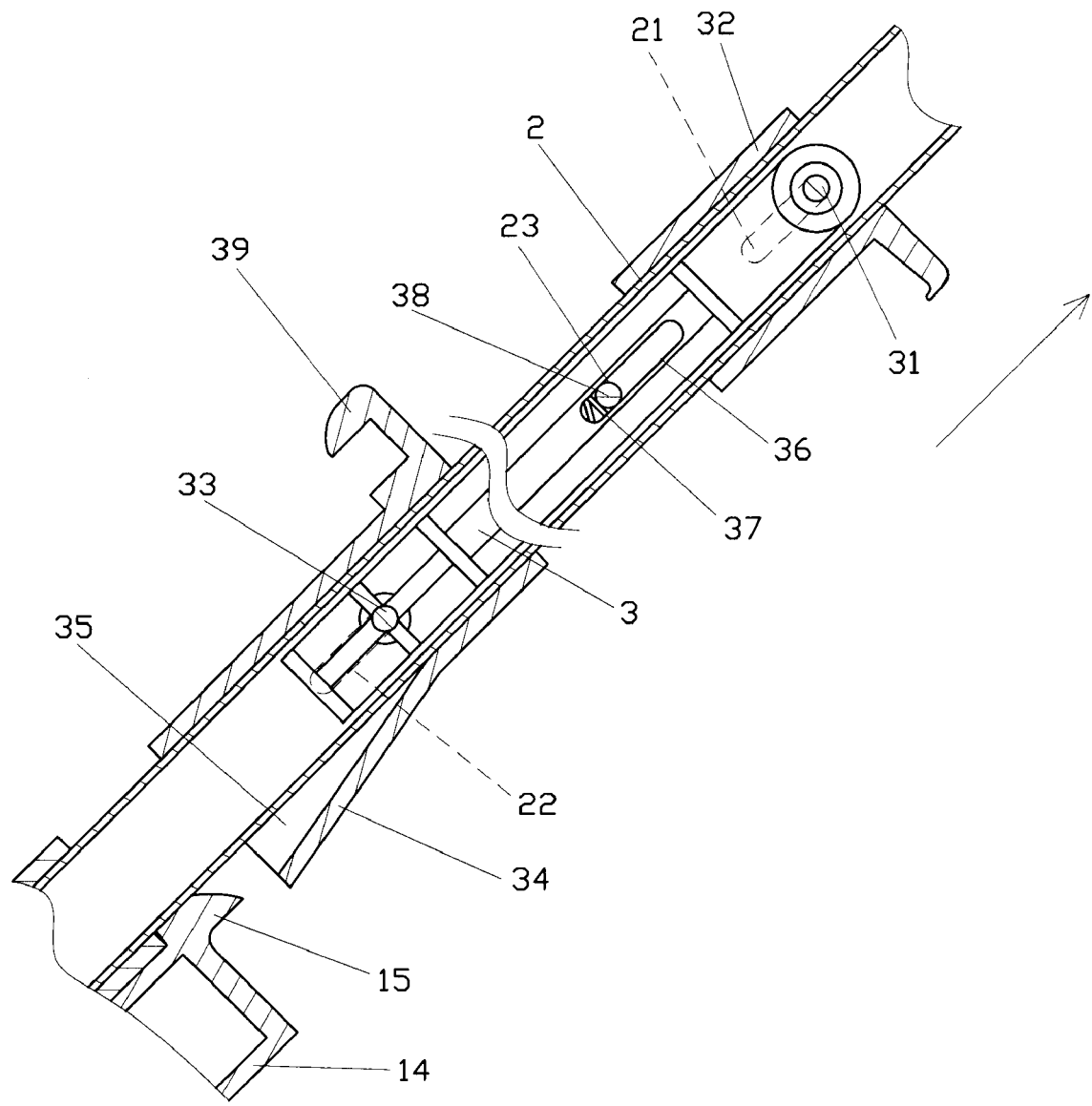
FIG. 4 is a cross sectional view to show that the locking unit is operated to separate the protrusion from the recess.
Figure 5:
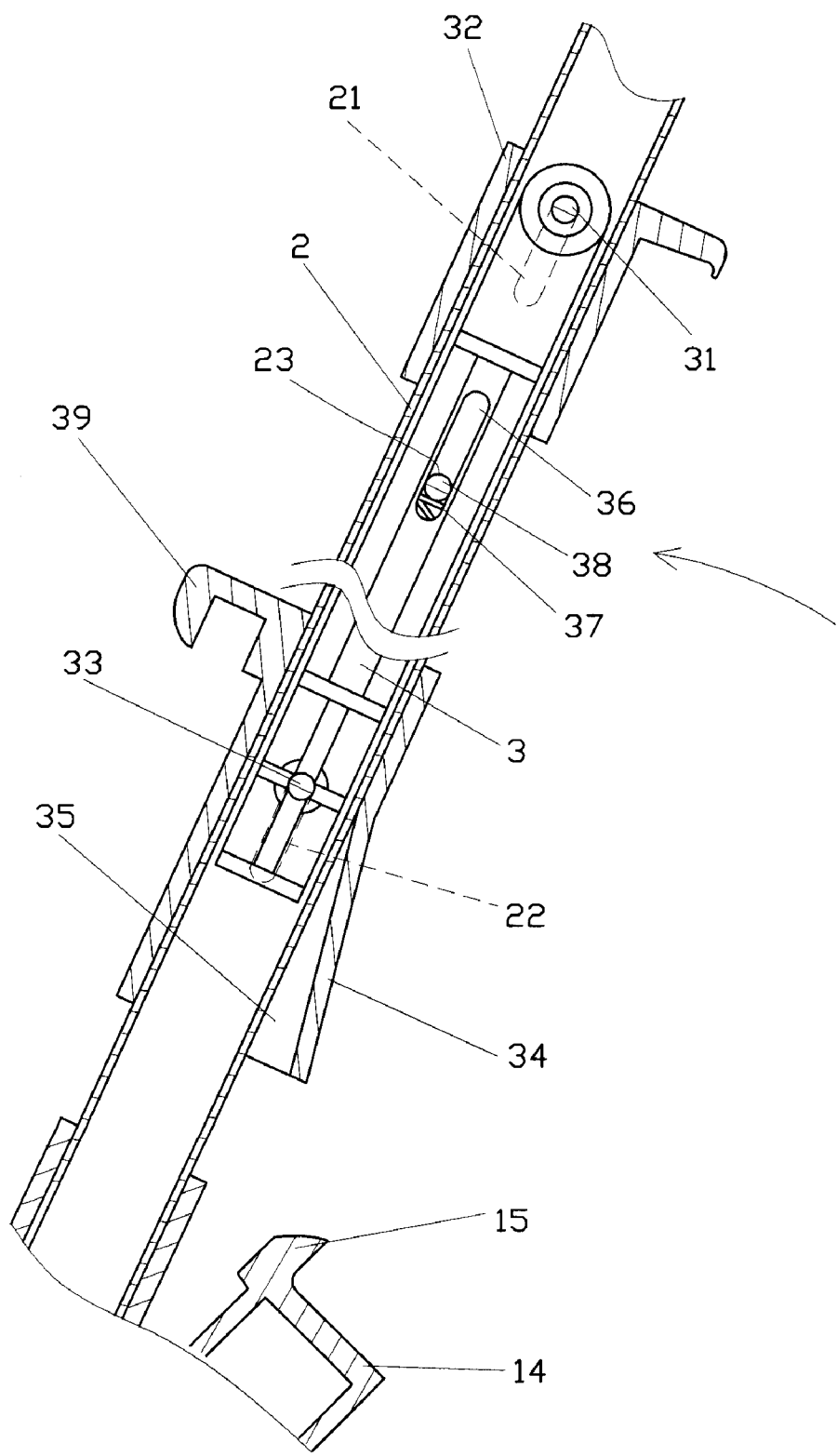
FIG. 5 is a cross sectional view to show that the handle is pulled to disengage from the engaging member.
Figure 6:
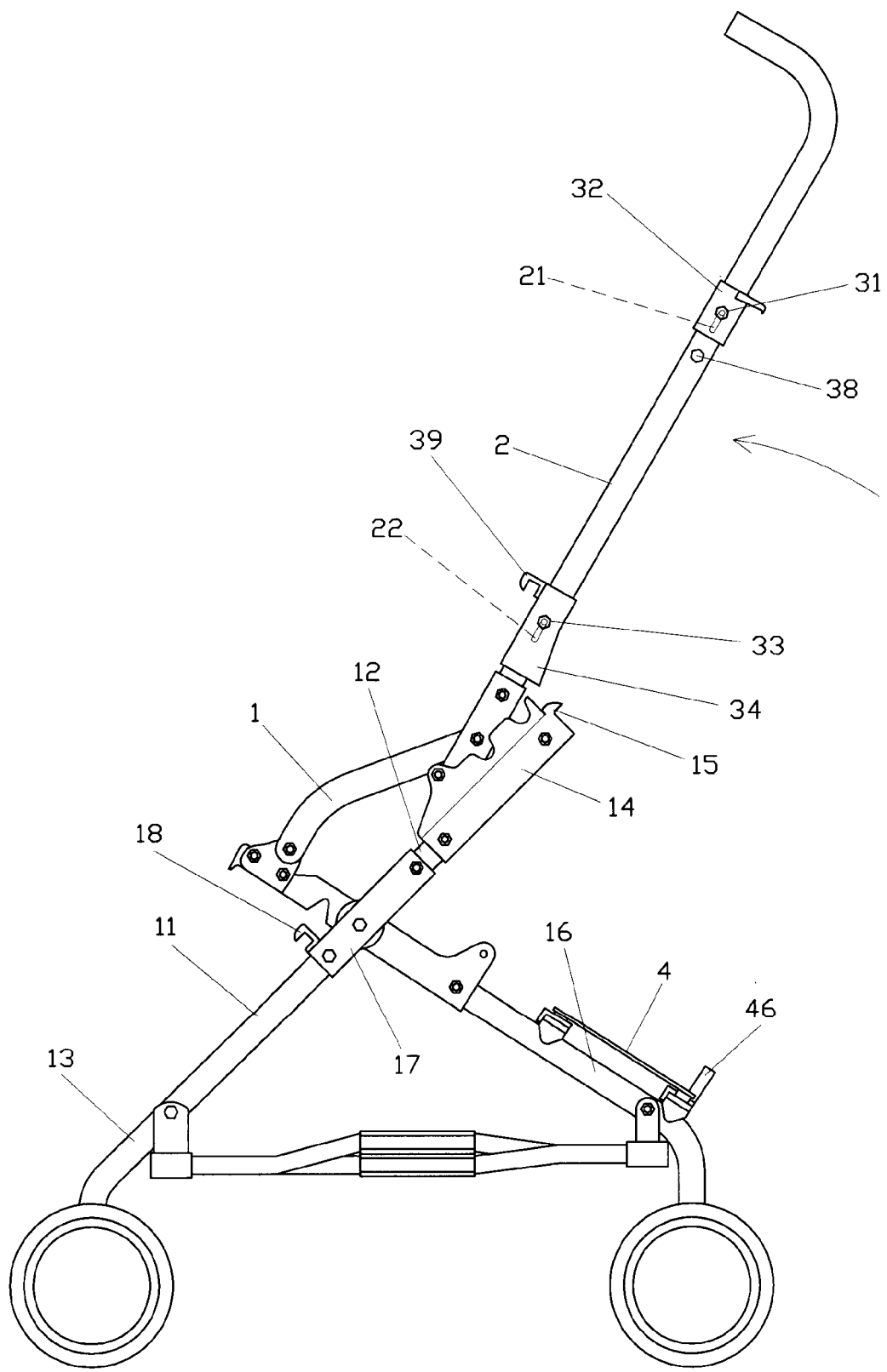
FIG. 6 is a side view to show that the handle is pulled to disengage from the engaging member.
Figure 7:
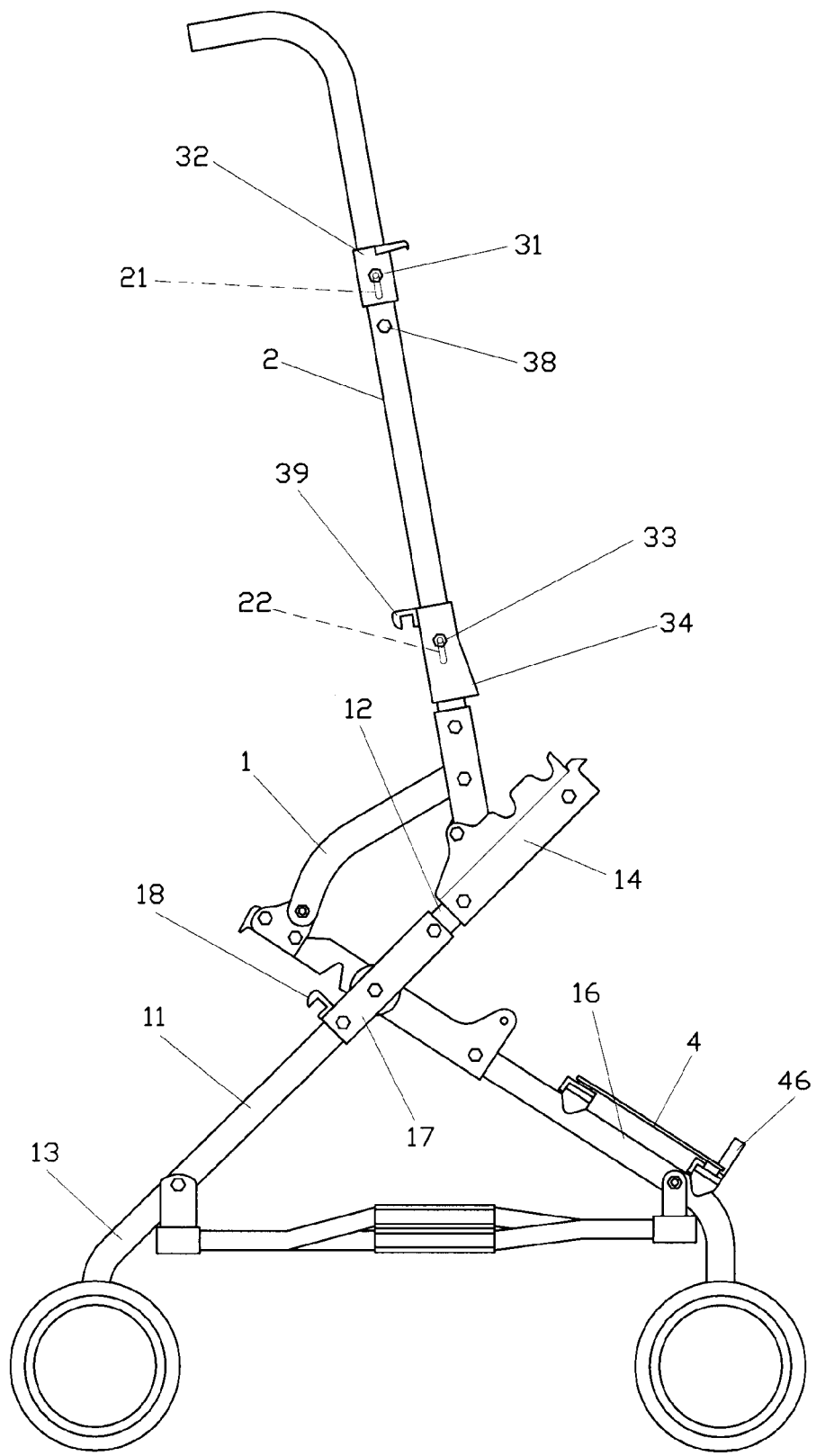
FIG. 7 is a side view to show that the handle is moved toward the first support rod.
Figure 8:
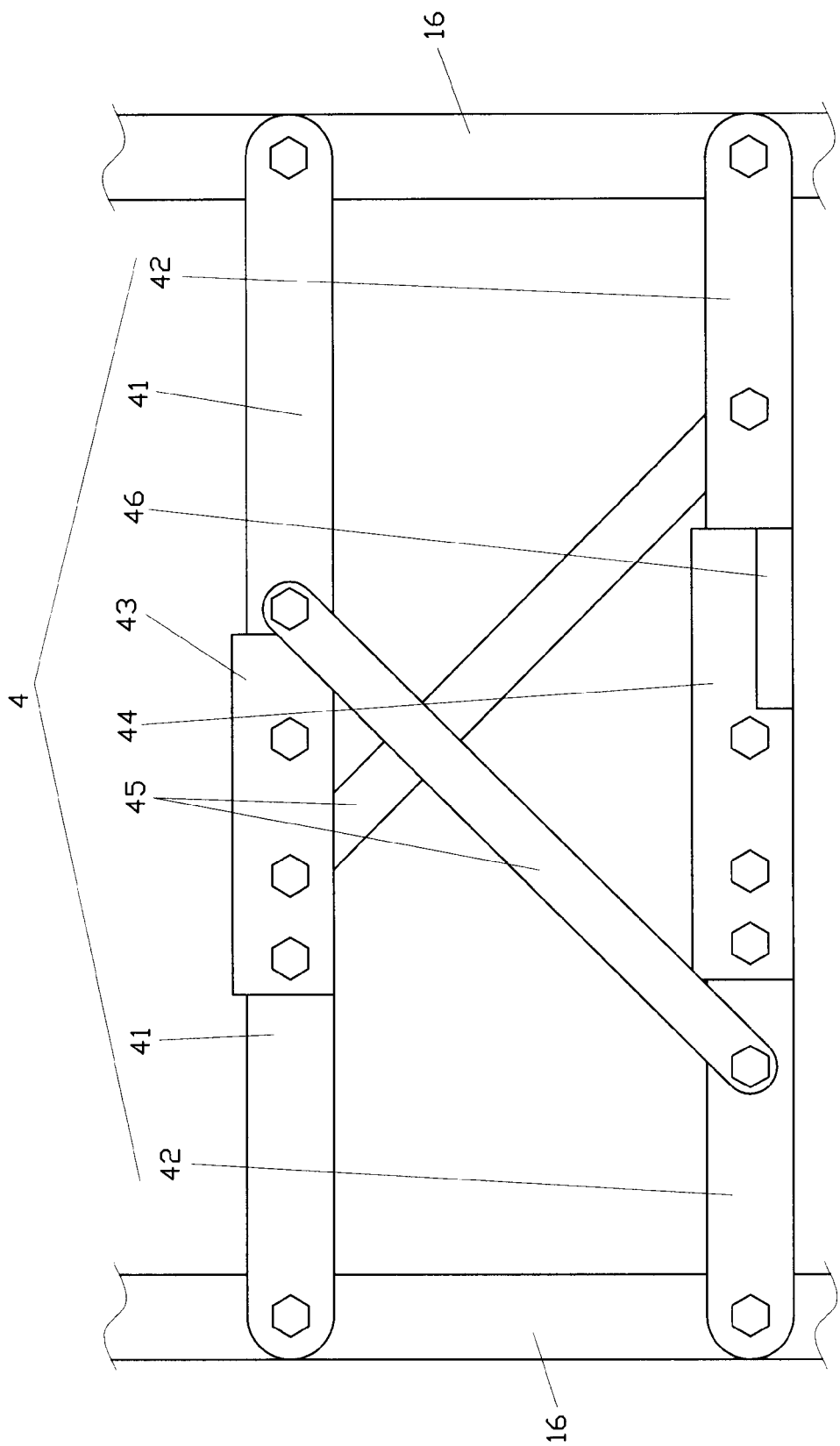
FIG. 8 shows the collapsible unit of the present invention.
Figure 9:
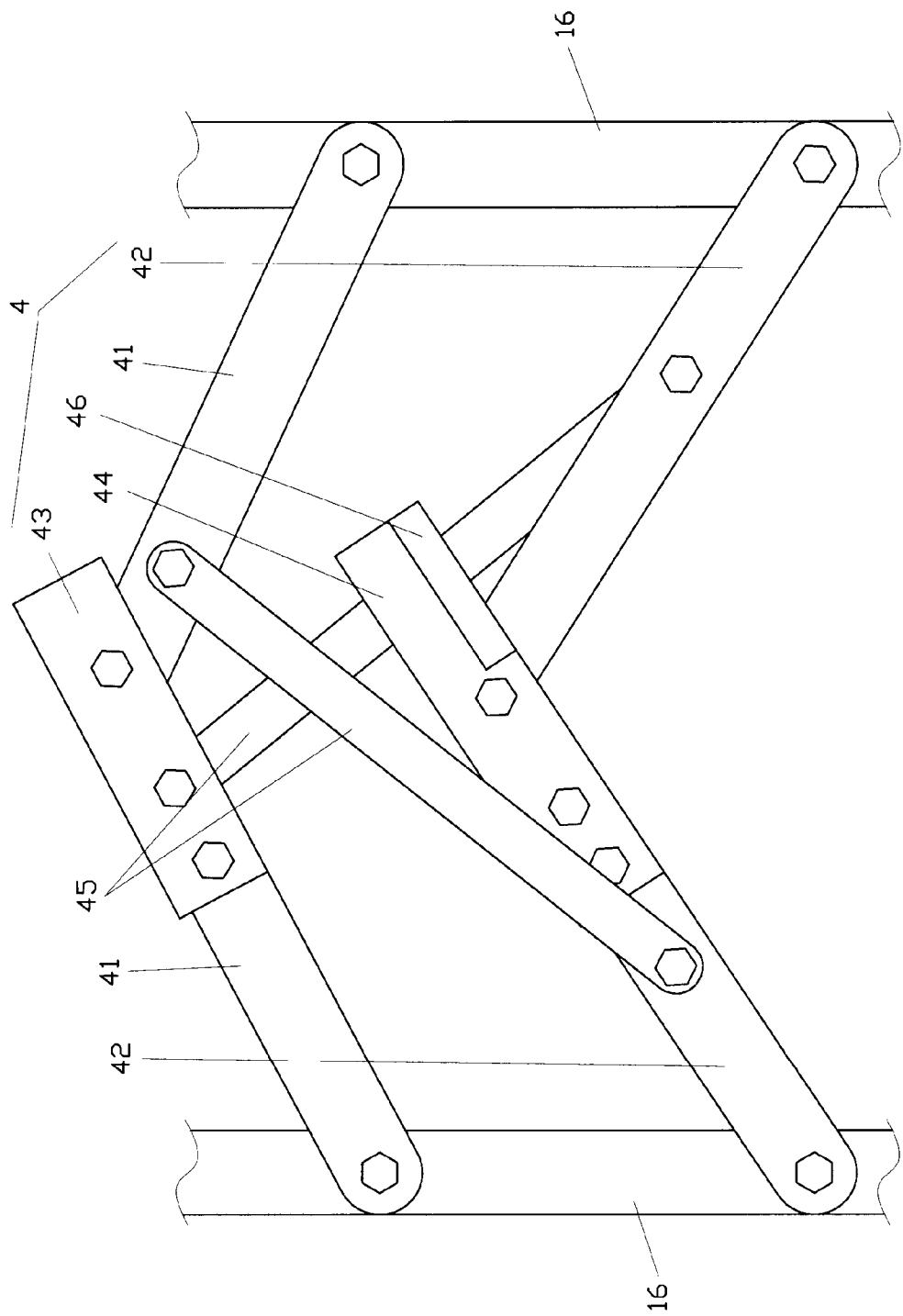
FIG. 9 shows that the collapsible unit of the present invention is folded when a force is applied to the operation portion.
Figure 10:
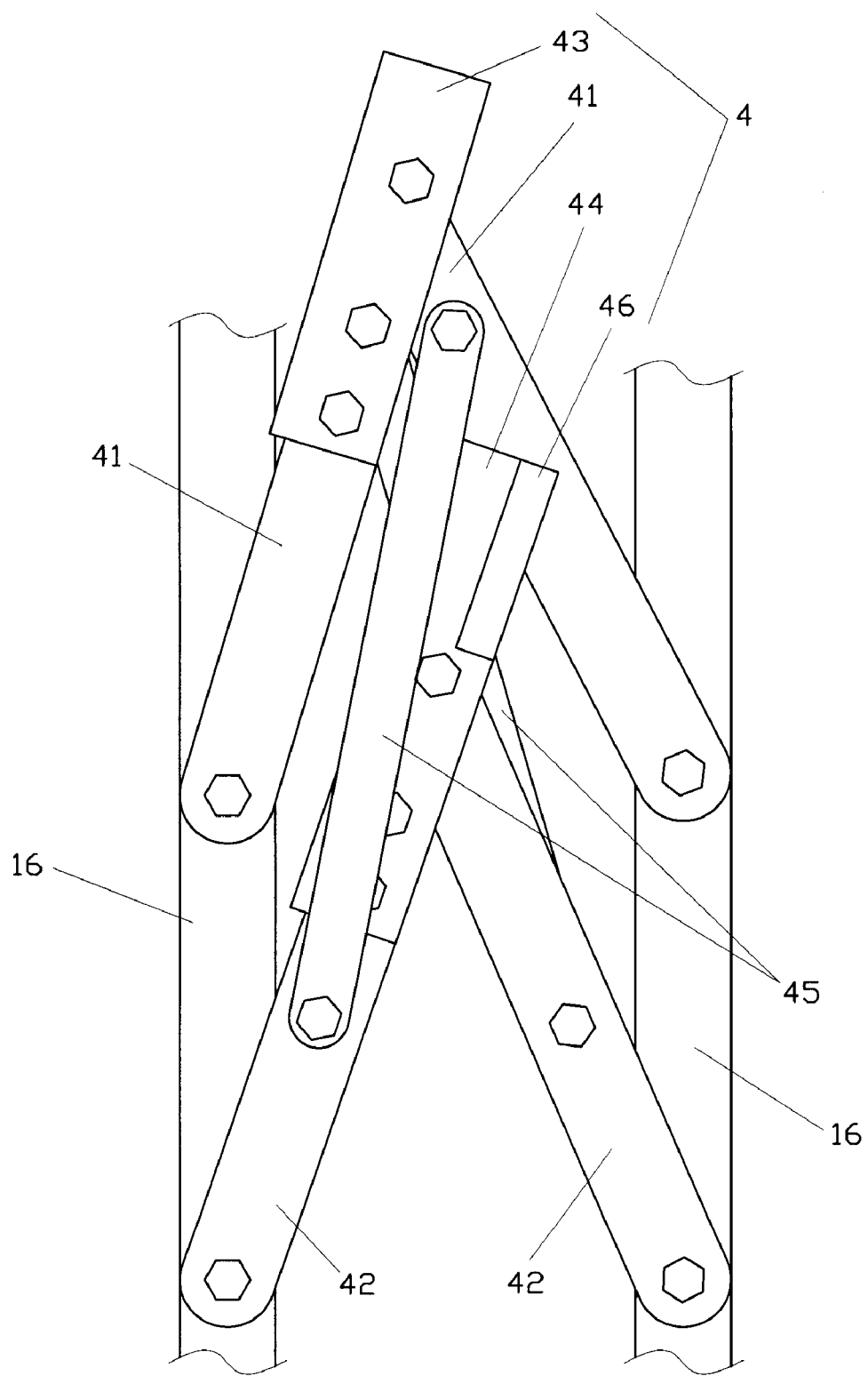
FIG. 10 shows the final status of the folded collapsible unit of the present invention.
Figure 11:
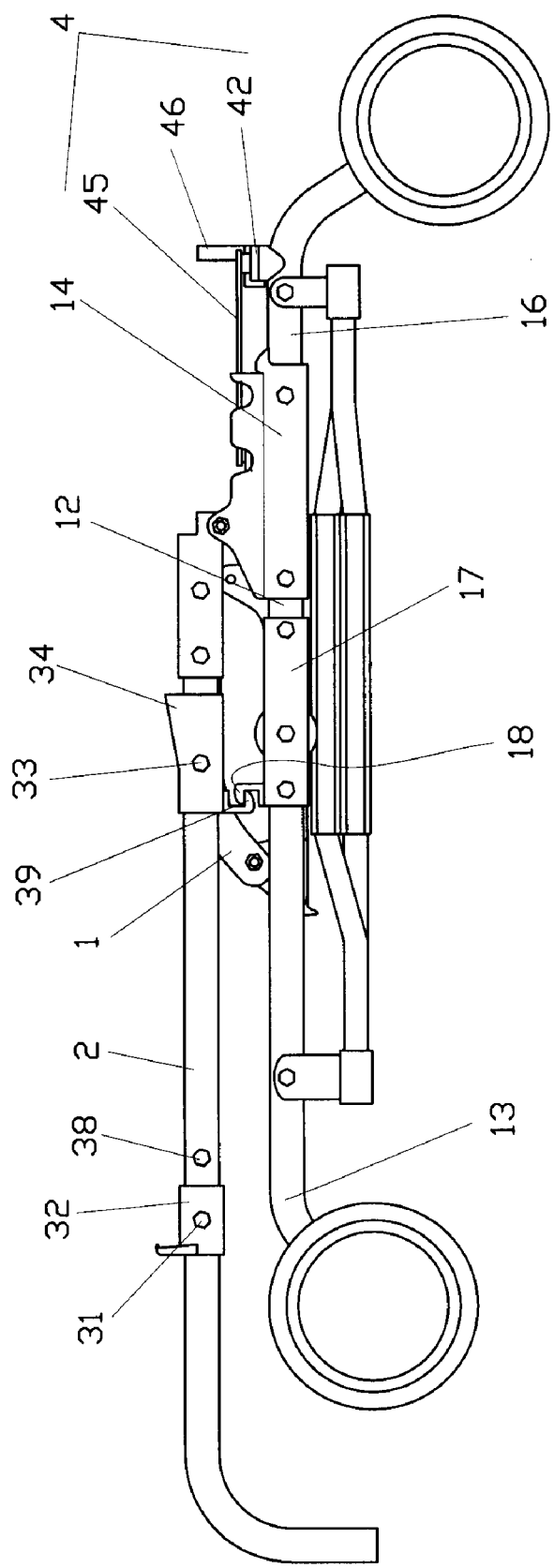
FIG. 11 shows the first and second hooks are hooked to each other.

When folding the baby stroller, as shown in FIGS. 1 and 3, the pull members 32 are pulled to move the first connection members 31 within the first slots 21 as shown in FIG. 4 and the locking units 3 are moved within the handles 2. The locking units 3 are moved in the second slots 22 by the second connection members 33. The restriction members 34 are then moved. When the locking units 3 are moved within the handles 2, the resilient members 37 contact against the third connection members 38 so that the resilient members 37 are compressed and the protrusions 15 are disengaged from the recesses 35 as shown in FIG. 5. The user then folds the handles 2 relative to the first support rods 11 of the main frame 1 as shown in FIGS. 6 and 7. The operation portion 46 is then lifted, such as being lifted by the user's foot to fold the collapsible unit 4 from a status as shown in FIG. 8. The two first links 41 and the two second links 42 are folded relative to the third link 43 and the fourth link 44 as shown in FIG. 9, and the two fifth links 45 are then folded. The two second support rods 16 are able to be moved toward each other as shown in FIG. 10 until the handles 2 are pivoted 180 degrees and positioned beside the first support rods 11. The pull members 32 are then released and the resilient members 37 bounce the locking units 3 in the handles 2 to their original positions. Meanwhile, the first connection members 31 move in the first slots 21 and the second connection members 32 move in the second slots 22. The restriction members 34 are moved to allow the second hooks 39 to be hooked with the first hooks 18 on the connection parts 17 of the first support rods 11 as shown in FIG. 11. By this way, the handles 2 are folded to the main frame 1 and the engagement between the first and second hooks 18, 39 ensures that the baby stroller is not unexpectedly expanded by impact.

When the user wants to expand the baby stroller, he or she simply proceeds the steps mentioned above in reverse sequences by pulling the pull members 32 of the locking units 3 to move the locking units 3 in the handles 2, the second hooks 39 can be separated from the first hooks 18, then the baby stroller can be expanded.

While we have shown and described the embodiment in accordance with the present invention, it should be clear to those skilled in the art that further embodiments may be made without departing from the scope of the present invention.

What is claimed is:

1. A collapsible structure for baby strollers, comprising:
  a main frame including two first support rods on two sides thereof and each first support rod having a first end and a second end, an engaging member connected to the first end of each of the first support rods and including a protrusion, two second support rods pivotally connected to the two first support rods respectively, each first support rod having a connection part which includes a first hook;
  two handles pivotally connected to the two engaging members respectively on the first support rods, the handles being hollow tubes and each including a first slot, a second slot and a positioning hole; and
  two locking units each having a first connection member which extends through a pull member and is movably engaged within the first slot, a second connection member extending through a restriction member and movably engaged within the second slot of each handle, each restriction member including a recess and having a second hook, the locking units each having a space in which a resilient member is located, a third connection member extending through the positioning hole of each said handle, and the resilient member contacting the third connection member.

2. A collapsible structure for baby strollers as claimed in claim 1, wherein a collapsible unit is pivotally connected between the two second support rods and includes two first links, two second links, a third link pivotally connected between the two first links, a fourth link pivotally connected between the two second links, and two fifth links pivotally connected among one of the two first links, the third link, and the two second links; the fourth link having an operation portion formed thereon.

* * * * *